United States Patent
Hirasawa et al.

(10) Patent No.: US 12,088,929 B2
(45) Date of Patent: Sep. 10, 2024

(54) IMAGE PROCESSING APPARATUS AND IMAGE PROCESSING METHOD WHICH PERFORMS REFLECTION REMOVAL PROCESSING BY USING POLARIZATION IMAGES

(71) Applicant: SONY GROUP CORPORATION, Tokyo (JP)

(72) Inventors: Yasutaka Hirasawa, Tokyo (JP); Yuhi Kondo, Tokyo (JP); Legong Sun, Tokyo (JP); Taishi Ono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/002,491

(22) PCT Filed: May 13, 2021

(86) PCT No.: PCT/JP2021/018202
§ 371 (c)(1),
(2) Date: Dec. 20, 2022

(87) PCT Pub. No.: WO2022/004145
PCT Pub. Date: Jan. 6, 2022

(65) Prior Publication Data
US 2023/0239580 A1    Jul. 27, 2023

(30) Foreign Application Priority Data
Jun. 29, 2020 (JP) .................................. 2020-111249

(51) Int. Cl.
*H04N 23/81* (2023.01)
*H04N 23/71* (2023.01)
*H04N 23/76* (2023.01)

(52) U.S. Cl.
CPC ............. *H04N 23/81* (2023.01); *H04N 23/71* (2023.01); *H04N 23/76* (2023.01)

(58) Field of Classification Search
CPC ........ H04N 23/81; H04N 23/71; H04N 23/76; H04N 25/134
See application file for complete search history.

(56) References Cited

U.S. PATENT DOCUMENTS 5,028,138 A * 7/1991 Wolff ..................... G01B 11/24
356/369
7,948,622 B2 * 5/2011 Kanamori ............ G02B 5/3025
382/224

(Continued)

FOREIGN PATENT DOCUMENTS

JP   2009-290895 A   12/2009
WO  2016/136085 A1   9/2016

(Continued)

OTHER PUBLICATIONS

International Search Report and Written Opinion of PCT Application No. PCT/JP2021/018202, issued on Jul. 20, 2021, 08 pages of ISRWO.

*Primary Examiner* — Luong T Nguyen
(74) *Attorney, Agent, or Firm* — CHIP LAW GROUP (57) ABSTRACT

A same region detector detects a same region of a processing target for each of a plurality of different viewpoints from polarization images in a plurality of polarization directions acquired for each of the viewpoints. The polarization images in the plurality of polarization directions acquired for each of the plurality of different viewpoints are, for example, polarization images acquired by imaging over a period of a plurality of frames in which a positional relationship between the processing target and a polarization image acquisition unit that acquires the polarization images changes. A polarization degree calculation unit calculates a (Continued)

polarization degree of the same region for each of the viewpoints on the basis of the polarization images in the plurality of polarization directions. A reflection removal unit performs reflection removal processing on the same region of the processing target by using the polarization images in the plurality of polarization directions of the viewpoint at which the polarization degree calculated by the polarization degree calculation unit is maximized. A reflection component can be removed even when an angle between a plane direction of a reflecting surface and an imaging direction is not clear.

10 Claims, 9 Drawing Sheets

(56) References Cited

U.S. PATENT DOCUMENTS

| | | | | |
|---|---|---|---|---|
| 2009/0279807 A1* | 11/2009 | Kanamorl | ............ | G02B 5/3025 |
| | | | | 348/222.1 |
| 2016/0267348 A1* | 9/2016 | Kondo | ................ | G06V 10/462 |
| 2019/0273856 A1* | 9/2019 | Hirasawa | ................ | H04N 23/75 |

FOREIGN PATENT DOCUMENTS

| | | |
|---|---|---|
| WO | 2017/056821 A1 | 4/2017 |
| WO | 2018/092540 A1 | 5/2018 |
| WO | 2018/230119 A1 | 12/2018 |

* cited by examiner

IMAGE PROCESSING APPARATUS AND IMAGE PROCESSING METHOD WHICH PERFORMS REFLECTION REMOVAL PROCESSING BY USING POLARIZATION IMAGES

CROSS REFERENCE TO RELATED APPLICATIONS

This application is a U.S. National Phase of International Patent Application No. PCT/JP2021/018202 filed on May 13, 2021, which claims priority benefit of Japanese Patent Application No. JP 2020-111249 filed in the Japan Patent Office on Jun. 29, 2020. Each of the above-referenced applications is hereby incorporated herein by reference in its entirety.

TECHNICAL FIELD

This technology relates to an image processing apparatus, an image processing method, and a program, and enables removal of a reflection component even when an angle formed by a plane direction of a reflecting surface and an imaging direction is not clear.

BACKGROUND ART

Conventionally, not only a color image but also a polarization image is simultaneously acquired as disclosed in Patent Document 1, and calculation of a polarization degree and a normal line, separation of a diffuse reflection component and a specular reflection component, and the like are performed on the basis of the polarization image. In addition, Patent Document 2 discloses that a reflection angle, which is an angle formed by a plane direction corresponding to a normal direction of a reflecting surface and an imaging direction, is input so that a reflection component can be removed even in a case where the reflection angle does not form a Brewster's angle.

CITATION LIST

Patent Document

Patent Document 1: Japanese Patent Application Laid-Open No.
Patent Document 2: International Publication No. 2018/092540

SUMMARY OF THE INVENTION

Problems to be Solved by the Invention

Meanwhile, in a case where a reflection component of a color image is removed by using a polarization image, it is necessary to input a reflection angle in Patent Document 2. It is thus not possible to cope with a reflecting surface different from the input reflection angle.

Therefore, an object of this technology is to provide an image processing apparatus, an image processing method, and a program capable of removing a reflection component even when an angle formed by a plane direction of a reflecting surface and an imaging direction is not clear.

Solutions to Problems

A first aspect of this technology is an image processing apparatus including a same region detector that detects a same region of a processing target for each of a plurality of different viewpoints from polarization images in a plurality of polarization directions acquired for each of the viewpoints, a polarization degree calculation unit that calculates a polarization degree of the same region for each of the viewpoints on the basis of the polarization images in the plurality of polarization directions, and a reflection removal unit that performs reflection removal processing on the same region of the processing target by using the polarization images in the plurality of polarization directions of the viewpoint at which the polarization degree calculated by the polarization degree calculation unit is maximized.

In this technology, a same region detector detects a same region of a processing target for each of a plurality of different viewpoints from polarization images in a plurality of polarization directions acquired for each of the viewpoints. The polarization images in the plurality of polarization directions acquired for each of the plurality of different viewpoints are polarization images acquired by imaging over a period of a plurality of frames in which a positional relationship between the processing target and the polarization image acquisition unit that acquires the polarization images changes, for example, polarization images acquired by imaging the processing target that moves, or polarization images acquired by performing imaging by the polarization image acquisition unit that moves. Furthermore, the polarization images in the plurality of polarization directions acquired for the plurality of different viewpoints are polarization images acquired by providing polarization image acquisition units that acquire the polarization images at a plurality of viewpoint positions and imaging the processing target by each of the polarization image acquisition units.

The polarization degree calculation unit calculates a polarization degree of the same region for each of the viewpoints on the basis of the polarization images in the plurality of polarization directions, and the reflection removal unit performs the reflection removal processing on the same region of the processing target by using the polarization images in the plurality of polarization directions of the viewpoint at which the polarization degree calculated by the polarization degree calculation unit is maximized. Furthermore, in a case where a position of the processing target is fixed, a position of the viewpoint at which the polarization degree calculated by the polarization degree calculation unit is maximized may be stored together with the position of the processing target, and the reflection removal unit may perform the reflection removal processing by using the polarization images of the processing target, the polarization images being acquired by the polarization image acquisition unit at a position of the viewpoint at which the polarization degree is maximized.

A second aspect of this technology is an image processing method including detecting, by a same region detector, a same region of a processing target for each of a plurality of different viewpoints from polarization images in a plurality of polarization directions acquired for each of the viewpoints, calculating a polarization degree of the same region by a polarization degree calculation unit for each of the viewpoints on the basis of the polarization images in the plurality of polarization directions, and performing reflection removal processing on the same region of the processing target by a reflection removal unit by using the polarization images in the plurality of polarization directions of the viewpoint at which the polarization degree calculated by the polarization degree calculation unit is maximized.

A third aspect of this technology is a program that causes a computer to remove a reflection component of a processing target, the program causing the computer to execute a procedure of detecting a same region of the processing target for each of a plurality of different viewpoints from polarization images in a plurality of polarization directions acquired for each of the viewpoints, a procedure of calculating a polarization degree of the same region for each of the viewpoints on the basis of the polarization images in the plurality of polarization directions, and a procedure of performing reflection removal processing on the same region of the processing target by using the polarization images in the plurality of polarization directions of the viewpoint at which the polarization degree having been calculated is maximized.

Note that the program of the present technology is, for example, a program that can be provided to a general-purpose computer capable of executing various program codes by a storage medium provided in a computer-readable format, a communication medium, for example, a storage medium such as an optical disk, a magnetic disk, a semiconductor memory, or the like, or a communication medium such as a network or the like. By providing such a program in a computer-readable format, processing according to the program is implemented on the computer.

MODE FOR CARRYING OUT THE INVENTION

Hereinafter, an embodiment for implementing the present technology will be described. Note that the description will be made in the following order.

1. Principle and problem of reflected light removal processing
2. Configuration of embodiment
3. Operation of embodiment
4. Application examples <1. Principle and Problem of Reflected Light Removal Processing>

Figure 1:
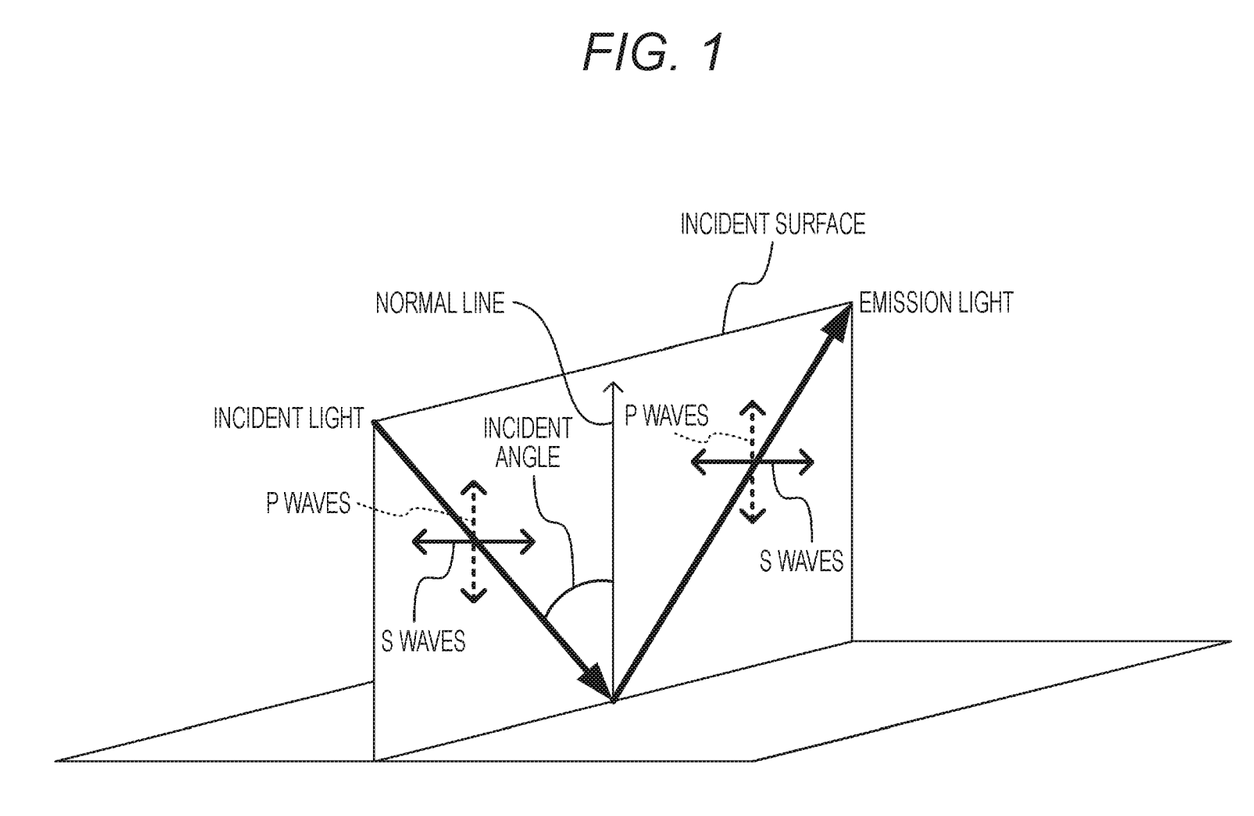
FIG. 1 is a diagram for describing P waves and S waves.
Figure 2:
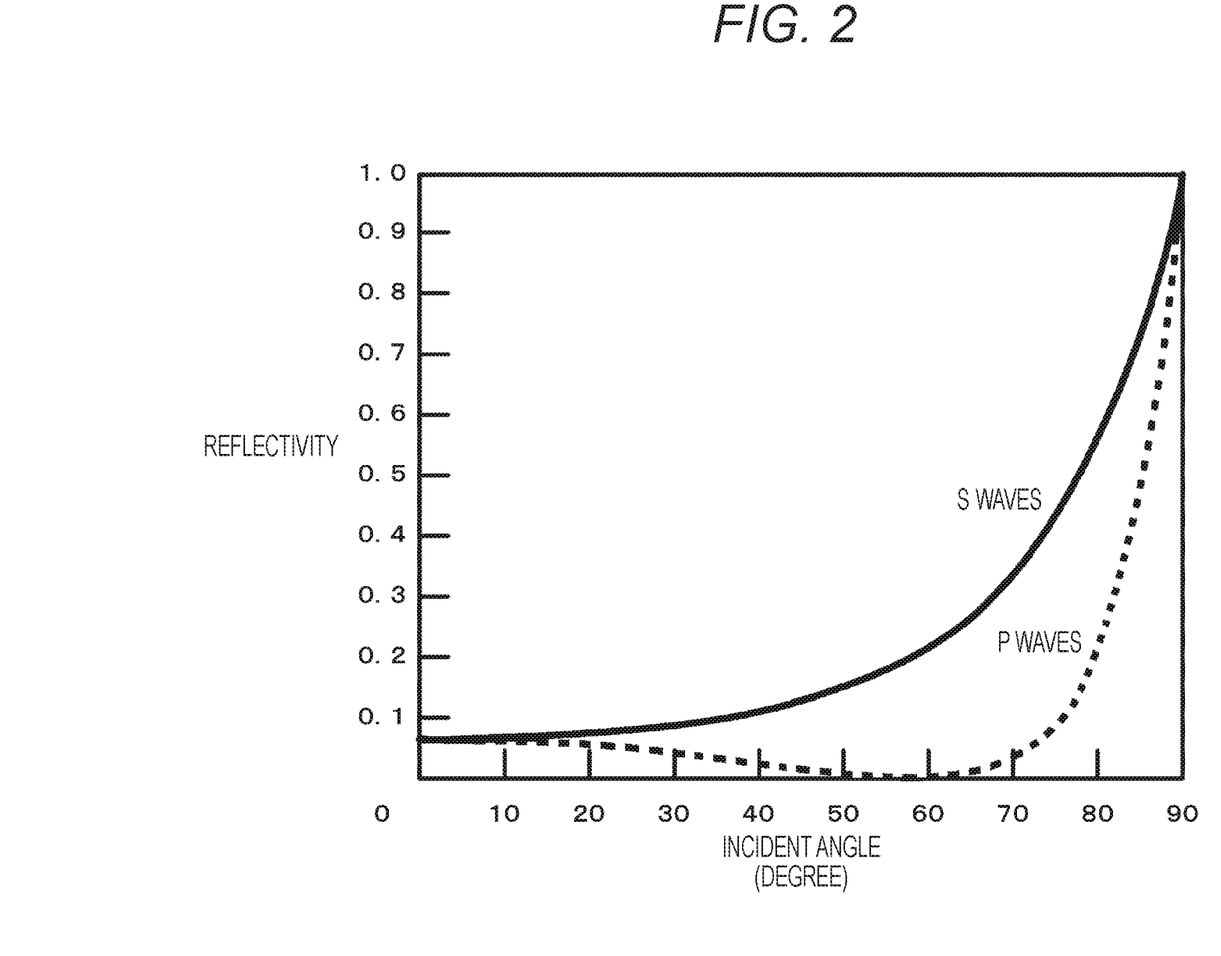
FIG. 2 is a diagram showing specular reflection of S waves and P waves with respect to an incident angle.

Next, a principle and problem of reflected light removal processing will be described. FIG. 1 is a diagram for describing P waves and S waves. The P waves represent light having only a component parallel to an incident surface, and the S waves represent light having only a component perpendicular to the incident surface. FIG. 2 shows specular reflection of the S waves and the P waves with respect to an incident angle. Note that a solid line indicates a characteristic of the S waves, and a broken line indicates a characteristic of the P waves.

It is known that reflectivity of P waves becomes substantially 0 when attention is paid to an incident angle (=reflection angle) of about 70 degrees, and an angle at which reflectivity of the P waves becomes substantially "0" is called a Brewster's angle. Therefore, when the incident angle becomes the Brewster's angle, the reflected light includes no component of the P waves but only a component of the S waves. Thus, the reflection component can be removed by removing the component of the S waves by a polarizing filter. However, in a case where the reflection angle is an angle away from the Brewster's angle, the reflected light includes the component of the S waves and the component of the P waves. It is therefore not possible to acquire an image from which the reflection component is removed by reducing the component of the S waves by the polarizing filter.

Therefore, an image processing apparatus of the present disclosure solves the problem of the angle between a plane direction of a reflecting surface and an imaging direction, and performs processing of removing or reducing a reflected light component from not only a captured image in a specific direction limited by the Brewster's angle but also images captured from various directions to acquire a clear subject image (transmitted light image or transmitted light component image). Specifically, a same region of a processing target is detected from the polarization images in a plurality of polarization directions acquired for a plurality of different viewpoints, a polarization degree of the same region is calculated for each of the viewpoints, and reflection removal processing of the same region is performed by using the polarization images in the plurality of polarization directions of a viewpoint at which a polarization degree is maximized.

Figure 3:
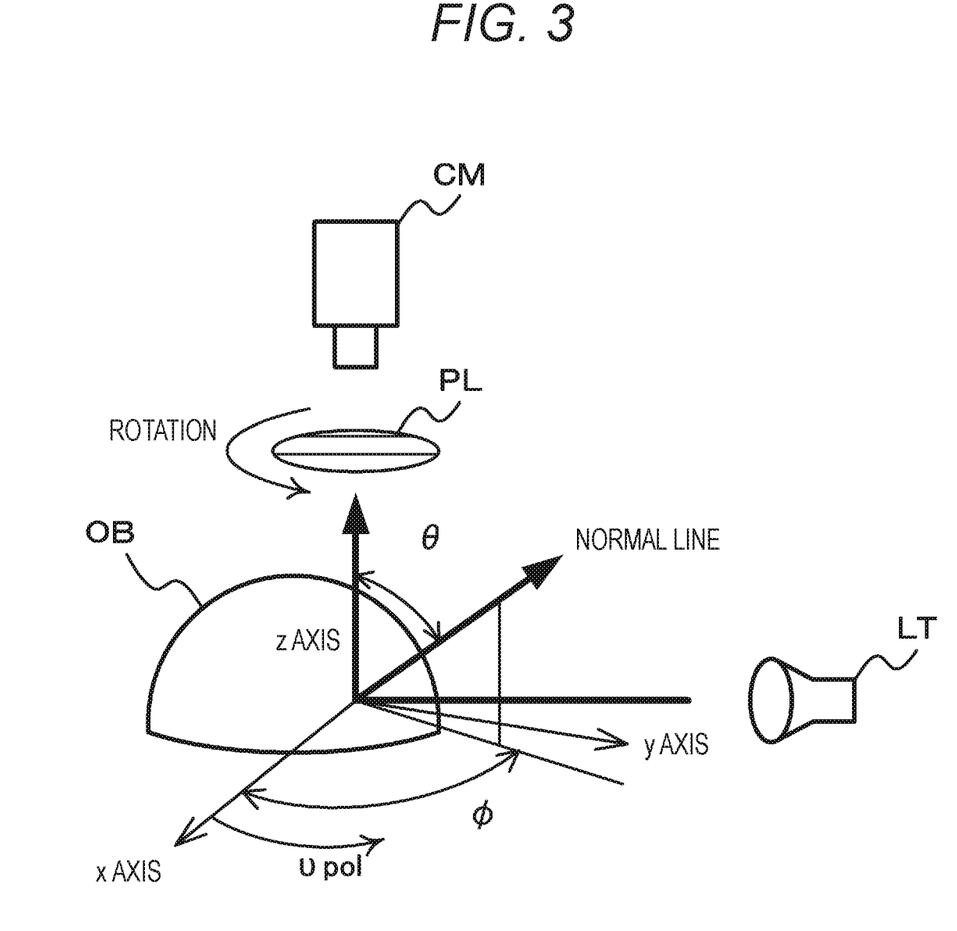
FIG. 3 is a diagram for describing a luminance change of a polarization image.

FIG. 3 is a diagram for describing a luminance change of a polarization image. As illustrated in FIG. 3, a subject OB is illuminated by using a light source LT, and the subject OB is imaged by an imaging unit CM via a polarizing plate P L. In this case, in the polarization image generated by the imaging unit CM, it is known that a luminance of the subject OB changes in accordance with rotation of the polarizing plate PL. Here, the highest luminance when the polarizing plate PL is rotated is defined as Imax, and the lowest luminance is defined as Imin. In addition, in a case where an x axis and a y axis in two-dimensional coordinates are a planar direction of the polarizing plate PL, an angle on an xy plane with respect to the x axis when the polarizing plate PL is rotated is defined as a polarization angle $\upsilon pol$. When the polarizing plate PL is rotated by 180 degrees, the polarizing plate PL returns to an original polarization state and has a cycle of 180 degrees.

Figure 4:
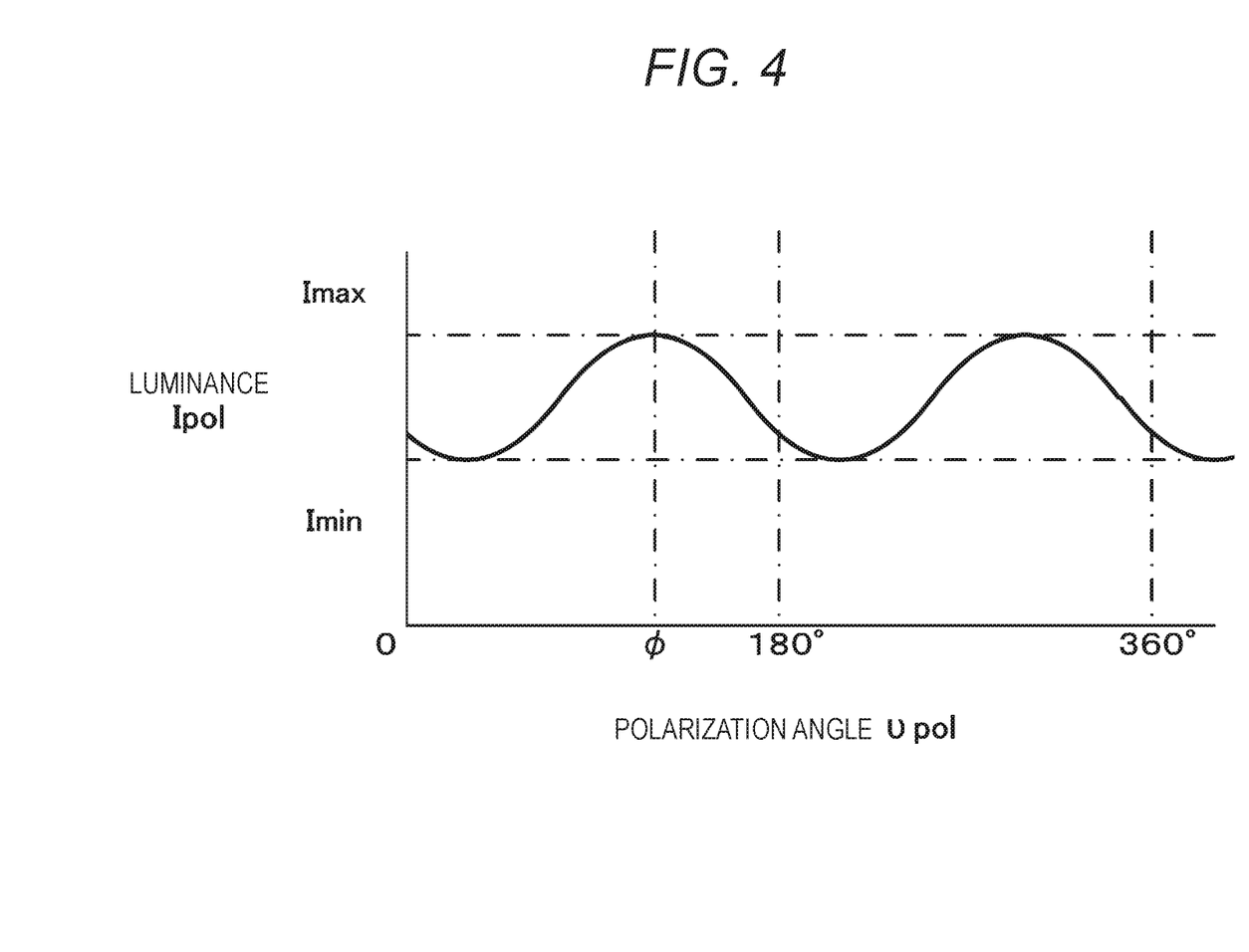
FIG. 4 is a diagram exemplifying a relationship between a luminance and a polarization angle.

FIG. 4 exemplifies a relationship between the luminance and the polarization angle. The polarization angle $\upsilon pol$ when the maximum luminance Imax is observed is defined as an azimuth angle φ. When such a definition is made, a polarization model expression indicating a change in a luminance Ipol observed when the polarizing plate PL is rotated, that is, a predetermined luminance change caused by a difference in the polarization angle can be represented as equation (1).

[Equation 1]

$$I_{pol} = \frac{I_{max} + I_{min}}{2} + \frac{I_{max} - I_{min}}{2} \cos(\upsilon_{pol} - \phi) \quad (1)$$

In equation (1), the polarization angle $\upsilon pol$ is clear upon generation of a polarization image, and the maximum luminance Imax, the minimum luminance Imin, and the azimuth angle φ are variables. Thus, since the number of variables is three, fitting to a function shown in equation (1) can be performed by using, for example, the luminance of the polarization image in three or more polarization directions. In addition, a polarization degree p can be calculated by performing a calculation of equation (2) using the maximum luminance Imax and the minimum luminance Imin. Furthermore, as is clear from equation (2), when a specular reflection component is large, the polarization degree p is large.

[Equation 2]

$$\rho = \frac{I_{max} I_{min}}{I_{max} + I_{min}} \quad (2)$$

In addition, specular reflection occurs due to a dominant light source in an imaging scene. Furthermore, since a correction value is adjusted in accordance with a color of illumination in a white balance correction, it is considered that the color of the illumination that generates specular reflection is achromatic. In this case, RGB values representing the color of the illumination have the same value, and the specular reflection component can be removed by obtaining a color difference. Therefore, in the removal of specular reflection, for example, as disclosed in Patent Document "International Publication No. 2016-136085", calculation is performed from a polarization image on which white balance correction and the like have been performed by using a pixel value of a red pixel, a pixel value of a green image, and a pixel value of a blue pixel in a same polarizing pixel block, and a polarization image from which a specular reflection component has been removed is generated. Furthermore, in the removal of specular reflection, for example, a polarization image from which a specular reflection component by the light source is removed may be generated on the assumption that the light source is white.

2. Configuration of Embodiment

Figure 5:
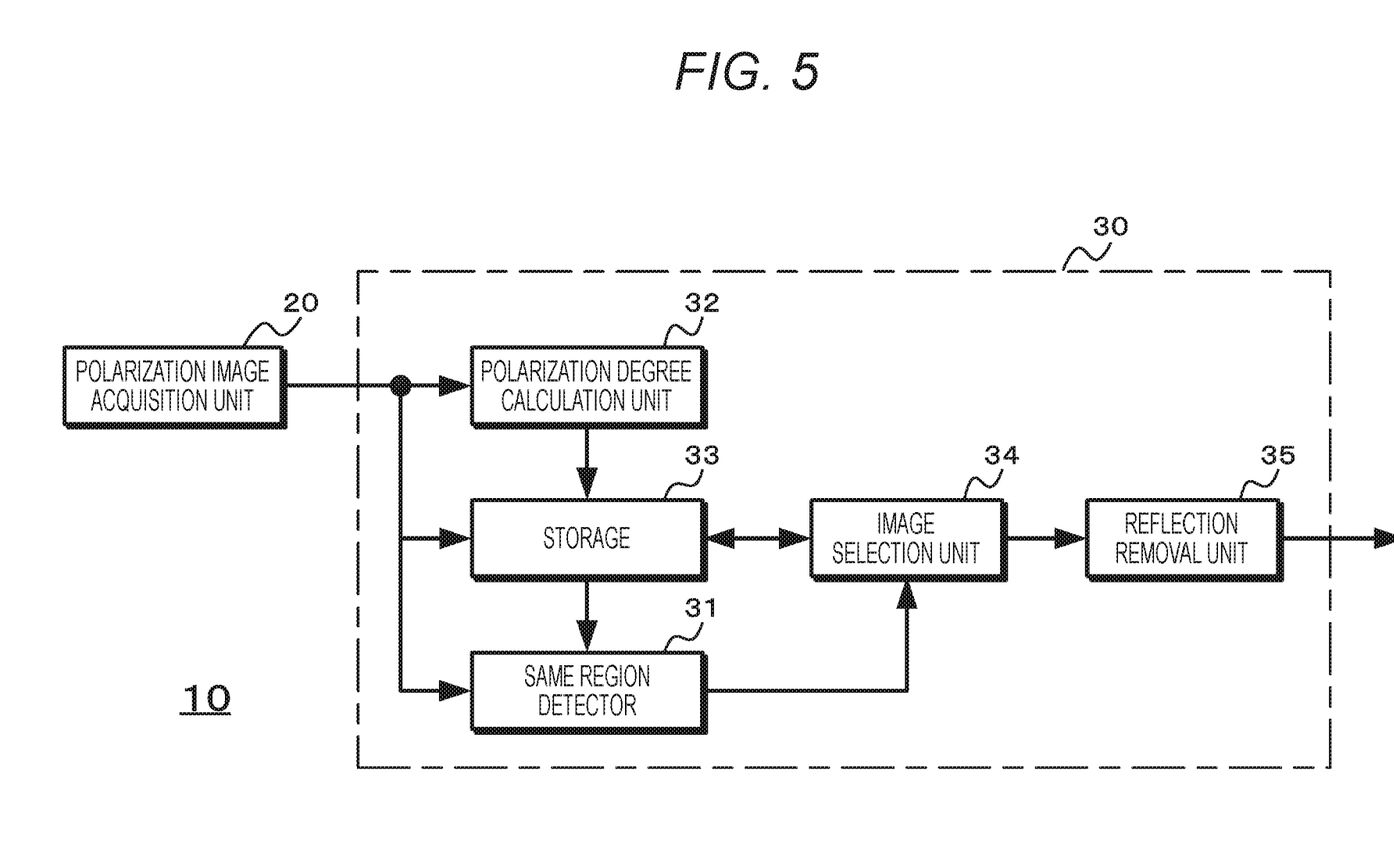
FIG. 5 is a diagram exemplifying a configuration of an embodiment.

Next, a configuration of the embodiment will be described. FIG. 5 exemplifies the configuration of the embodiment. An image processing system 10 includes a polarization image acquisition unit 20 and an image processor 30.

Figure 6A:
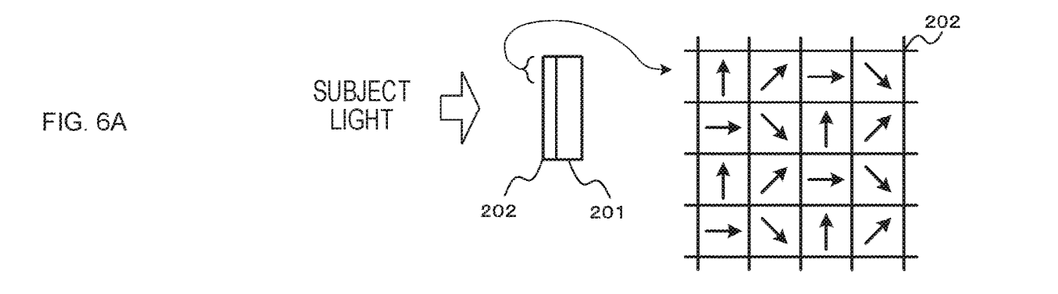
FIGS. 6A, 6B, 6C, and 6D are diagrams exemplifying a configuration of a polarization image acquisition unit.
Figure 6B:
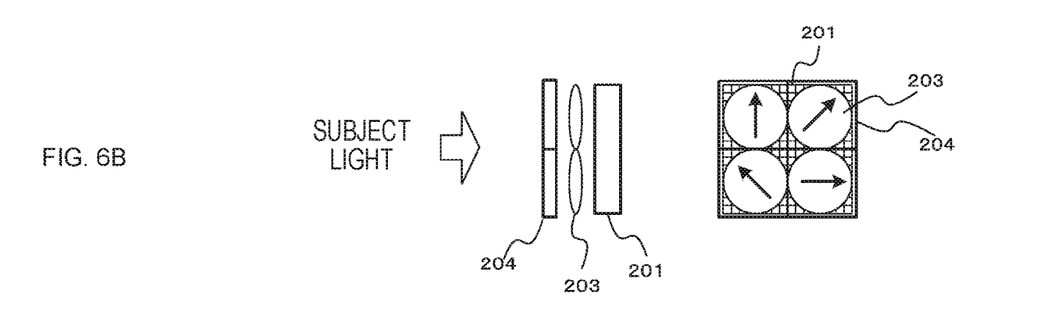
Figure 6C:
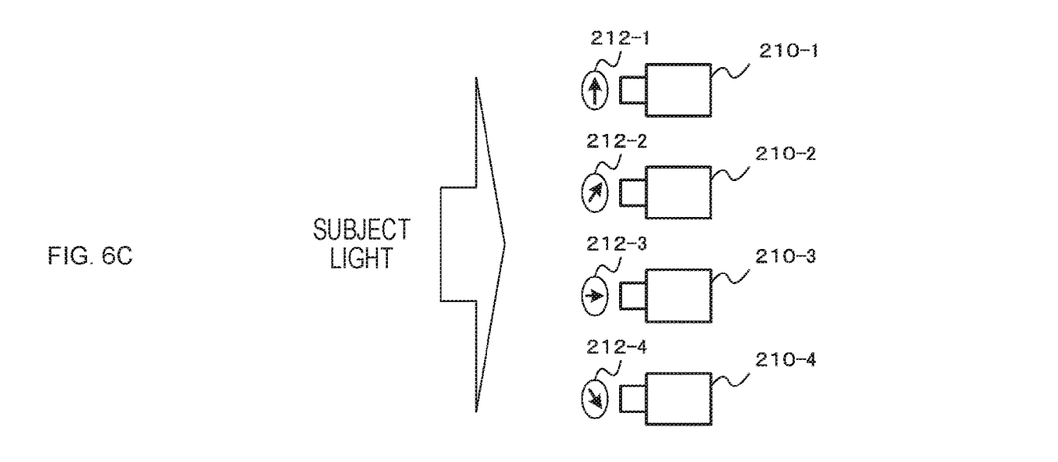

The polarization image acquisition unit 20 images a subject and acquires a polarization image. FIGS. 6A, 6B, 6C, and 6D exemplifie a configuration of the polarization image acquisition unit. For example, as illustrated in FIG. 6A, the polarization image acquisition unit 20 performs imaging by disposing a polarizing plate 202 having a pixel configuration in a plurality of polarization directions in an image sensor 201. Note that, FIG. 6A exemplifies a case where the polarizing plate 202, each pixel of which is a pixel in any of four different types of polarization directions (polarization directions are indicated by arrows), is disposed on a front surface of the image sensor 201. Furthermore, as illustrated in FIG. 6B, the polarization image acquisition unit 20 may generate a plurality of polarization images in different polarization directions by using a configuration of a multi-lens array. For example, a plurality of (four in the drawing) lenses 203 is provided on the front surface of the image sensor 201, and each of the lenses 203 forms an optical image of a subject on an imaging surface of the image sensor 201. In addition, a polarizing plate 204 is provided on a front surface of each lens 203, polarization directions (polarization directions are indicated by arrows) of the polarizing plate 204 are made different directions, and a polarization image including pixels in a plurality of polarization directions is generated. The polarization image acquisition unit 20 configured in this manner enables acquisition of a polarization image including pixels in a plurality of polarization directions by one imaging. Furthermore, as illustrated in FIG. 6C, polarizing plates 212-1 to 212-4 in different polarization directions may be provided in front of imaging units 210-1 to 210-4 to generate a plurality of polarization images in different polarization directions.

Figure 6D:
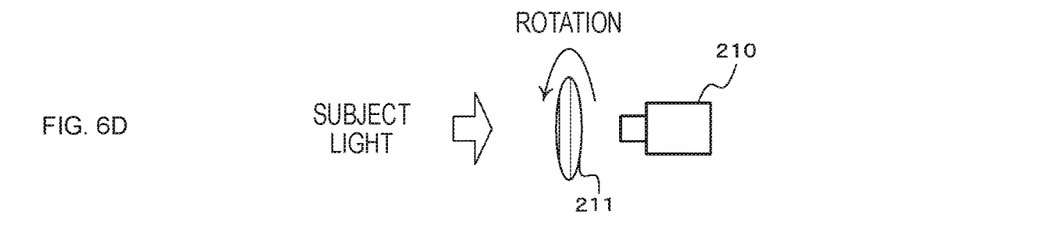

Note that, in a case where movement of the subject is slow or in a case where the subject moves stepwise, as illustrated in FIG. 6D, a polarizing plate 211 may be provided in front of an imaging unit 210. In this case, the polarizing plate 211 is rotated to perform imaging in a plurality of different polarization directions, to acquire a plurality of polarization images in different polarization directions.

The plurality of different polarization directions may be any combination of angles as long as all the angles are different. For example, 0 degrees, 60 degrees, and 120 degrees are used in a case where three polarization directions are used, and 0 degrees, 45 degrees, 90 degrees, and 135 degrees are used in a case where four polarization directions are used.

In a case where no color filter is used in the image sensor 201, the polarization image acquisition unit 20 can acquire a luminance polarization image. Here, in a case of FIG. 6A, it is possible to acquire an image equivalent to an unpolarized normal luminance image by averaging luminance of four adjacent pixels in different polarization directions. In addition, in cases of FIGS. 6B and 6C, when a positional interval of each lens 203 and the imaging units 210-1 to 210-4 is negligibly short with respect to a distance to an abnormality detection target, disparity can be ignored in a plurality of polarization images in different polarization directions. It is therefore possible to acquire an image equivalent to the unpolarized normal luminance image by averaging luminance of polarization images in different polarization directions. Furthermore, in a case where the disparity cannot be ignored, it is possible to acquire an image equivalent to the unpolarized normal luminance image by aligning polarization images in different polarization directions in accordance with a disparity amount and averaging a luminance of the aligned polarization images. In addition, in a case of FIG. 6D, it is possible to acquire an image equivalent to the unpolarized normal luminance image by averaging luminance of luminance polarization images in different polarization directions for each pixel.

Moreover, the polarization image acquisition unit 20 may simultaneously generate not only the luminance polarization image but also three primary color images by providing a color filter in the image sensor 201, or may simultaneously generate an infrared image or the like. Furthermore, the polarization image acquisition unit 20 may calculate a luminance from the three primary color images to generate a luminance image.

Figure 7A:
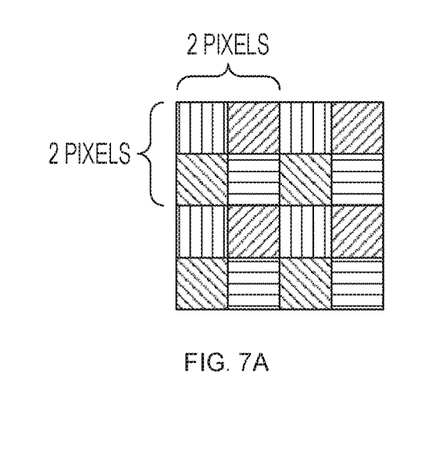
FIGS. 7A, 7B, 7C, 7D, 7E, 7F, and 7G are diagrams exemplifying a pixel configuration in a plurality of polarization directions.
Figure 7B:
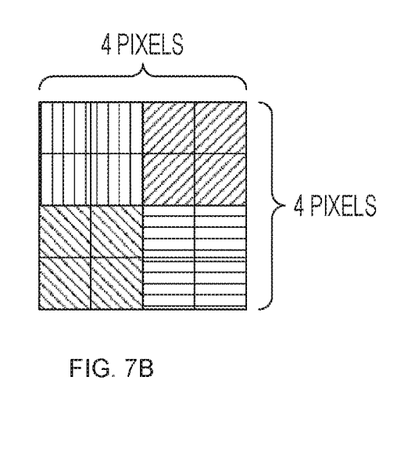

FIGS. 7A, 7B, 7C, 7D, 7E, 7F, and 7G exemplifie a pixel configuration in a plurality of polarization directions, and the configuration illustrated in FIGS. 7A, 7B, 70, 7D, 7E, 7F, and 7G are repeated in a horizontal direction and a vertical direction. Each of FIGS. 7A and 7B illustrates a pixel configuration in a case where a black-and-white image is acquired. Note that FIG. 7A exemplifies a case where a polarizing pixel block of 2×2 pixels includes, for example, polarizing pixels in polarization directions (polarization angles) of 0 degrees, 45 degrees, 90 degrees, and 135 degrees. In addition, FIG. 7B exemplifies a case where a polarizing pixel block of 4×4 pixels includes, for example, polarizing pixels in polarization directions of 0 degrees, 45 degrees, 90 degrees, and 135 degrees with 2×2 pixels as a unit of polarization direction. Note that in a case where a polarization component unit of the polarizing plate is 2×2 pixels as illustrated in FIG. 7B, a ratio of polarization component leakage from adjacent regions of different polarization component units to polarization components acquired for each polarization component unit is lower than in a case of 1×1 pixel illustrated in FIG. 7A. In addition, in a case where a wire grid is used as the polarizing plate, polarized light having an electric field component perpendicular to a direction of a grid (wire direction) is transmitted, and then the longer the wire, the higher the transmittance. Thus, in a case where the polarization component unit is 2×2 pixels, the transmittance is higher than in the case of 1×1 pixels. Therefore, in a case where the polarization component unit is 2×2 pixels, the transmittance is higher than in the case of 1×1 pixels, and an extinction ratio can be improved.

Figure 7C:
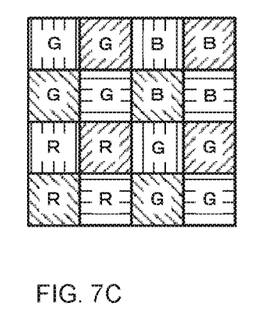

Each of FIGS. 7C, 7D, 7E, 7F, and 7G exemplifies a pixel configuration in a case where a color image is acquired. FIG. 7C illustrates a case where the polarizing pixel block of 2×2 pixels illustrated in FIG. 7A is set as one color unit, and three primary color pixels (a red pixel, a green pixel, and a red pixel) are arranged in a Bayer array.

Figure 7D:
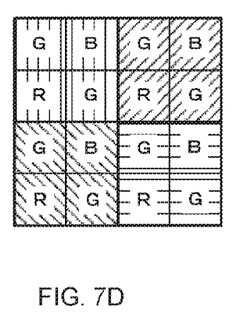

FIG. 7D exemplifies a case where the three primary color pixels are provided in the Bayer array for each pixel block of 2×2 pixels in a same polarization direction illustrated in FIG. 7B.

Figure 7E:
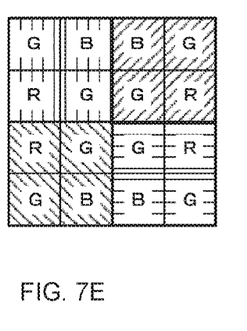
Figure 7F:
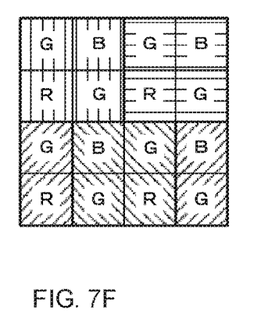

FIG. 7E exemplifies a case where the three primary color pixels are provided in the Bayer array for each pixel block of 2×2 pixels in the same polarization direction, and blocks of 2×2 pixels in different polarization directions are set as pixels of a same color.

FIG. 7E illustrates a case where, for a pixel block of 2×2 pixels in the Bayer array in the same polarization direction, a phase difference in the polarization direction from a pixel block adjacent in the horizontal direction is 90 degrees, and a phase difference in the polarization direction from a pixel block adjacent in the vertical direction is ±45 degrees.

Figure 7G:
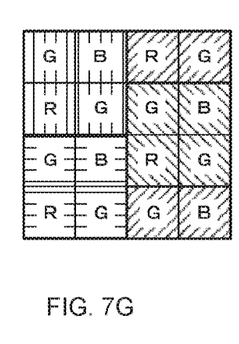

FIG. 7G illustrates a case where, for a pixel block of 2×2 pixels in the Bayer array in the same polarization direction, a phase difference in the polarization direction from a pixel block adjacent in the vertical direction is 90 degrees, and a phase difference in the polarization direction from a pixel block adjacent in the horizontal direction is ±45 degrees.

In addition, in the pixel configuration, a block of 2×2 pixels may include the three primary color pixels and white pixels, or may include a pixel block of three primary colors and a pixel block of white. Furthermore, the block of 2×2 pixels may include polarizing pixels and non-polarizing pixels in different polarization directions, or may include a polarizing pixel block and a non-polarizing pixel block in different polarization directions. In a case where such a pixel configuration is used, the polarization image acquisition unit 20 generates, for each polarization direction, polarization imaging pixels having a resolution in a pixel unit, that is, in units of pixel blocks of a predetermined number of pixels. Furthermore, in a case where the pixel block is in the Bayer array, polarization imaging pixels having a resolution in units of one pixel may be generated for each polarization direction by using existing demosaic processing.

The polarization image acquisition unit 20 acquires polarization images in a plurality of polarization directions for each of a plurality of different viewpoints. For example, as the configuration of (a) of FIG. 2, (b) of FIG. 2, or (c) of FIG. 2, the polarization image acquisition unit 20 images a moving subject over a period of a plurality of frames to acquire polarization images in a plurality of polarization directions for each of a plurality of different viewpoints. Furthermore, the polarization image acquisition unit 20 may be provided at a plurality of different viewpoint positions to image the subject, and then each of the plurality of polarization image acquisition units 20 may acquire polarization images in a plurality of polarization directions.

Returning to FIG. 5, the image processor 30 includes a same region detector 31, a polarization degree calculation unit 32, a storage 33, an image selection unit 34, and a reflection removal unit 35.

The same region detector 31 detects the same region of the processing target for each viewpoint from the polarization image acquired by the polarization image acquisition unit 20. For example, the same region detector 31 detects the same region of the processing target by using the polarization image acquired by the polarization image acquisition unit 20 and the polarization image stored in the storage 33 as described later. The same region detector 31 outputs a same region detection result to the image selection unit 34. Note that, when the same region detector 31 detects the same region of the processing target from each polarization image, if a shape change in the polarization image of the subject caused by movement of the subject or a difference in viewpoint position of the polarization image acquisition unit 20 is corrected, the same region can be easily detected by using the corrected polarization image.

The polarization degree calculation unit 32 calculates a polarization degree for each pixel unit of the polarization image for each of a plurality of different viewpoints. The polarization degree calculation unit 32 calculates a polarization degree for each pixel unit on the basis of equation (2) by using polarization images in a plurality of polarization directions. In addition, the polarization degree calculation unit 32 calculates the polarization degree for each of the plurality of different viewpoints, and outputs the calculated polarization degree to the storage 33.

The storage 33 stores the polarization images in the plurality of polarization directions acquired for each of the plurality of different viewpoints by the polarization image acquisition unit 20. In addition, the storage 33 stores the polarization degree calculated for each pixel unit for each of the plurality of viewpoints.

The image selection unit 34 reads the polarization degree of the same region detected by the same region detector 31 from the storage 33 for each of the plurality of viewpoints. In addition, the image selection unit 34 compares the read polarization degrees to determine a viewpoint at which the polarization degree is maximized. For example, in a case where the same region is a plurality of pixel regions, the image selection unit 34 determines the viewpoint at which the polarization degree is maximized for each pixel position. Furthermore, the image selection unit 34 reads the polarization images for each of the plurality of polarization directions acquired from the viewpoint at which the polarization degree is maximized from the storage 33 and outputs the polarization images to the reflection removal unit 35.

The reflection removal unit 35 removes the specular reflection component by using the polarization image selected by the image selection unit 34. Note that removal of the specular reflection component is only required to be performed by using a method disclosed in, for example, Patent Document "International Publication No. 2016/136085", Patent Document "International Publication No. 2018/230119", or the like.

3. Operation of Embodiment

Figure 8:
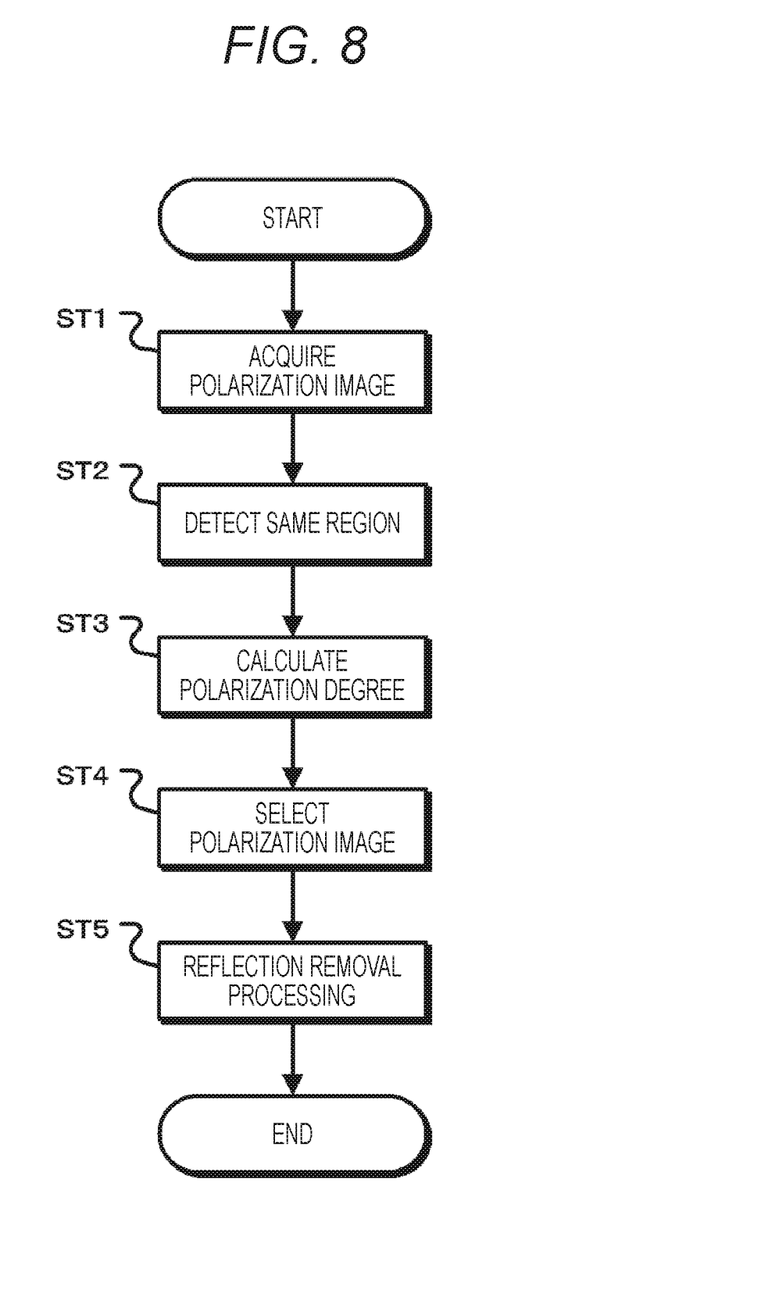
FIG. 8 is a flowchart exemplifying an operation according to the embodiment.

FIG. 8 is a flowchart exemplifying an operation according to the embodiment. In step ST1, the image processor acquires a polarization image. The image processor 30 acquires polarization images in a plurality of polarization directions for each of a plurality of different viewpoints from the polarization image acquisition unit 20, and the processing proceeds to step ST2.

In step ST2, the image processor detects the same region. The same region detector 31 of the image processor 30 detects the same region of the processing target for each viewpoint from the polarization image acquired in step ST1, and the processing proceeds to step ST3.

In step ST3, the image processor calculates a polarization degree. The polarization degree calculation unit 32 of the image processor 30 calculates the polarization degree for each viewpoint for each pixel unit by using the polarization images in the plurality of polarization directions, and the processing proceeds to step ST4.

In step ST4, the image processor selects a polarization image. The image selection unit 34 of the image processor 30 determines the viewpoint at which the polarization degree calculated in step ST3 is maximized for each pixel position in the same region detected in step ST2, and selects the polarization image of the viewpoint at which the polarization degree is maximized, and the processing proceeds to step ST5.

In step ST5, the image processor performs reflection removal processing. The reflection removal unit 35 of the image processor 30 removes the specular reflection component by using the polarization image selected in step ST4, and sets an image of the same region detected in step ST2 as an image from which reflection is removed or suppressed.

Figure 9A:
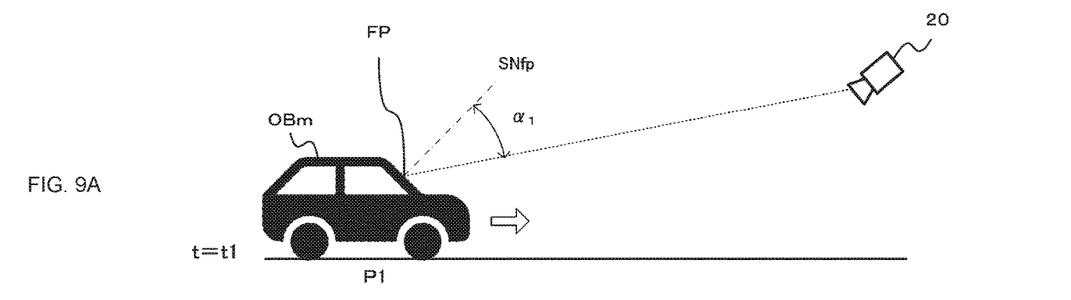
FIGS. 9A, 9B, and 9C are diagrams showing an operation example of the embodiment.
Figure 9B:
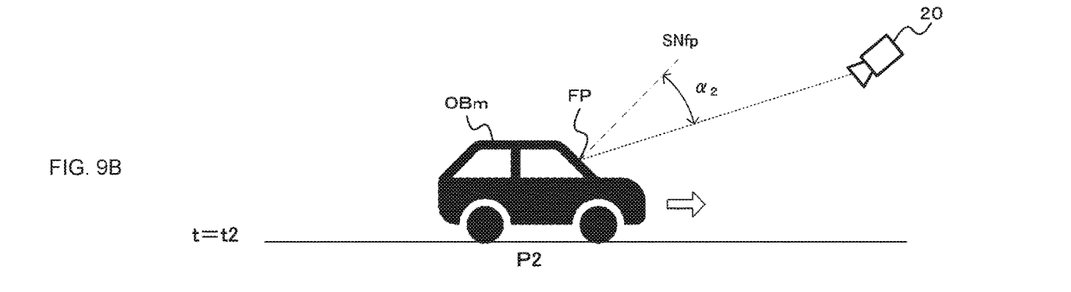
Figure 9C:
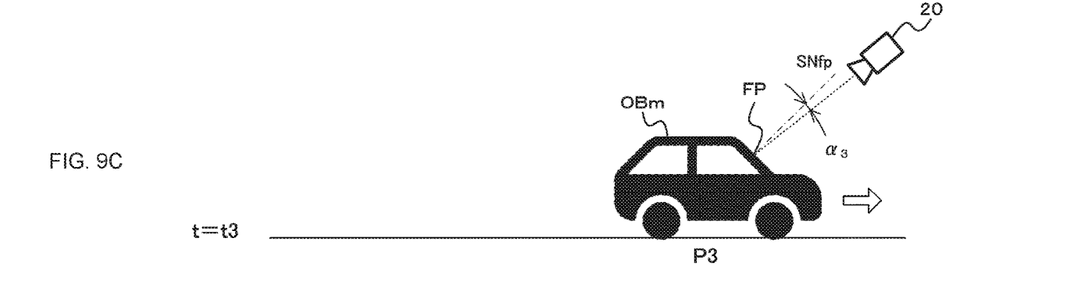

FIGS. 9A, 9B, and 9C illustrate an operation example of the embodiment. A processing target is a moving vehicle OBm. The polarization image acquisition unit 20 is fixed ahead in front of the vehicle OBm, and images the vehicle OBm to acquire a polarization image. Note that a normal line of the region FP on the windshield of the vehicle OBm is a normal line SNfp. In addition, the image processor 30 (not shown) performs the reflection removal processing on the region FP in the windshield of the vehicle OBm by using the polarization image acquired by imaging over a period of a plurality of frames in which a positional relationship between, for example, the vehicle OBm as the processing target and the polarization image acquisition unit 20 that acquires the polarization image changes, as the polarization images in the plurality of polarization directions acquired for each of the plurality of different viewpoints.

FIG. 9A exemplifies a case where the vehicle OBm at time point t1 is at a position P1. In this case, an emission light from the region FP incident on the polarization image acquisition unit 20 has a reflection angle α1. FIG. 9B exemplifies a case where the vehicle OBm at time point t2 is at a position P2. In this case, an emission light from the region FP incident on the polarization image acquisition unit 20 has a reflection angle α2. FIG. 9C exemplifies a case where the vehicle OBm at time point t3 is at the position P1. In this case, an emission light from the region FP incident on the polarization image acquisition unit 20 has a reflection angle α3.

The image processor 30 calculates the polarization degree from the polarization images acquired by the polarization image acquisition unit 20 at each time point on the basis of the polarization images in the plurality of polarization directions in the region FP. Furthermore, the image processor 30 selects the polarization image at which the polarization degree is maximized. For example, when the reflection angle α2 is the Brewster's angle, the degree of polarization is maximized. Therefore, the image processor 30 uses polarization images in a plurality of polarization directions indicating the region FP acquired at time point t2 at which the polarization degree is maximized. In this case, since there are few P waves in the emission light from the region FP at time point t2, it is possible to obtain a captured image in which the specular reflection is suppressed by performing the reflection removal processing by using the polarization images in the plurality of polarization directions indicating the region FP acquired at time point t2 without setting the angle and the like of the emission light.

Furthermore, FIGS. 9A, 9B, and 9C exemplifie a case where the processing target is moving, but the position of the processing target may be fixed, and the polarization image acquisition unit may move. In addition, in a case where the position of the processing target is fixed and the polarization image acquisition unit moves, the position of the viewpoint at which the polarization degree calculated by the polarization degree calculation unit is maximized may be stored together with the position of the processing target. As described above, by storing the position of the processing target and the position of the viewpoint at which the polarization degree is maximized, in a case where the polarization image acquisition unit is provided in each moving body, the reflection component can be easily removed by using the polarization image acquired at the position based on stored information without calculating the polarization degree or determining the position of the viewpoint at which the calculated polarization degree is maximized in each moving body. For example, in a case where a building or the like that generates reflection is indicated by map information, a polarization image is acquired at a position of a viewpoint stored in association with a position of the building that generates reflection, and reflection generated by the building or the like can be easily removed.

4. Application Examples

The technology of the present disclosure can be applied to various fields. For example, the technology of the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like. In addition, it may be implemented as a device mounted on equipment used in a production process in a factory or equipment used in a construction field. In a case where the image processing apparatus of the present technology is applied to such a field, the reflection component can be easily removed, and thus, a system that enables safer traveling and the like can be constructed. In addition, in an application to a monitoring field or the like, a reflection component of a moving monitoring target can be easily removed.

The series of processing described herein can be executed by hardware, software, or a combined configuration of both. In a case of executing processing by software, a program storing a processing sequence is installed in a memory in a computer incorporated in dedicated hardware and executed. Alternatively, the program can be installed and executed in a general-purpose computer capable of executing various types of processing.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (BD) (registered trademark), a magnetic disk, a semiconductor memory card, or the like. Such a removable recording medium can be provided as so-called package software.

Furthermore, in addition to installing the program from the removable recording medium to the computer, the program may be transferred from a download site to the computer wirelessly or by wire via a network such as a local area network (LAN), the Internet, or the like. In the computer, the program thus transferred can be received and installed in a recording medium such as a built-in hard disk or the like.

Note that the effects herein described are merely examples and are not limited, and furthermore, additional effects that are not described herein may be obtained. Furthermore, the present technology should not be construed as being limited to the embodiment of the technology described above. The embodiment of this technology discloses the present technology in the form of exemplification, and it is obvious that those skilled in the art can make modifications or substitutions of the embodiment without departing from the gist of the present technology. That is, in order to determine the gist of the present technology, the claims should be taken into consideration.

Furthermore, the image processing apparatus of the present technology can adopt the following configurations.

(1) An image processing apparatus includes a same region detector that detects a same region of a processing target for each of a plurality of different viewpoints from polarization images in a plurality of polarization directions acquired for each of the viewpoints, a polarization degree calculation unit that calculates a polarization degree of the same region for each of the viewpoints on the basis of the polarization images in the plurality of polarization directions, and a reflection removal unit that performs reflection removal processing on the same region of the processing target by using the polarization images in the plurality of polarization directions of the viewpoint at which the polarization degree calculated by the polarization degree calculation unit is maximized.

(2) In the image processing apparatus according to (1), the polarization images in the plurality of polarization directions acquired for each of the plurality of different viewpoints are polarization images acquired by imaging over a period of a plurality of frames in which a positional relationship between the processing target and the polarization image acquisition unit that acquires the polarization images changes.

(3) In the image processing apparatus according to (2), the polarization images are polarization images acquired by imaging the processing target that moves.

(4) In the image processing apparatus according to (2), the polarization images are polarization images acquired by performing imaging by the polarization image acquisition unit that moves.

(5) In the image processing apparatus according to (1), the polarization images in the plurality of polarization directions acquired for the plurality of different viewpoints are polarization images acquired by providing polarization image acquisition units that acquire the polarization images at a plurality of viewpoint positions and imaging the processing target by each of the polarization image acquisition units.

(6) In the image processing apparatus according to any of (1) to (5), the polarization degree calculation unit calculates the polarization degree for each pixel unit.

(7) In the image processing apparatus according to any of (1) to (6), in a case where a position of the processing target is fixed, a position of the viewpoint at which the polarization degree calculated by the polarization degree calculation unit is maximized is stored together with the position of the processing target.

(8) In the image processing apparatus according to (7), the reflection removal unit performs the reflection removal processing by using the polarization images of the processing target, the polarization images being acquired by the polarization image acquisition unit at the position of the viewpoint at which the polarization degree is maximized.

REFERENCE SIGNS LIST

10 Image processing system
20 Polarization image acquisition unit
30 Image processor
31 Same region detector
32 Polarization degree calculation unit
33 Storage
34 Image selection unit
35 Reflection removal unit
201 Image sensor
202, 204, 211, 212-1 to 212-4 Polarizing plate
203 Lens
210, 210-1 to 210-4 Imaging unit

The invention claimed is:

1. An image processing apparatus, comprising:
a same region detector configured to detect a same region of a processing target for each of a plurality of viewpoints from polarization images in a plurality of polarization directions for each of the plurality of viewpoints; and
an image processor configured to:
calculate a polarization degree of the same region for each of the plurality of viewpoints based on the polarization images in the plurality of polarization directions; and
perform reflection removal process on the same region of the processing target based on the polarization images in the plurality of polarization directions of a viewpoint of the plurality of viewpoints at which the calculated polarization degree is maximized.

2. The image processing apparatus according to claim 1, wherein
the polarization images in the plurality of polarization directions for each of the plurality of viewpoints correspond to the polarization images based on imaging over a specific period of a plurality of frames, and
the specific period corresponds to a period of change in a positional relationship between the processing target and an image sensor that acquires the polarization images.

3. The image processing apparatus according to claim 2, wherein the polarization images are the polarization images acquired by imaging the processing target that moves.

4. The image processing apparatus according to claim 2, wherein the polarization images are the polarization images acquired by performing imaging by the image sensor that moves.

5. The image processing apparatus according to claim 1, wherein the polarization images in the plurality of polarization directions for the plurality of viewpoints are the polarization images acquired by an image sensor, wherein the image sensor acquires the polarization images at a plurality of viewpoint positions and images the processing target.

6. The image processing apparatus according to claim 1, wherein the image processor is further configured to calculate the polarization degree for each pixel unit.

7. The image processing apparatus according to claim 1, wherein based on a position of the processing target being fixed, a position of the viewpoint at which the calculated polarization degree is maximized is stored with the position of the processing target.

8. The image processing apparatus according to claim 7, wherein the image processor is further configured to perform the reflection removal process based on the polarization images of the processing target, and the polarization images is at the position of the viewpoint at which the calculated polarization degree is maximized.

9. An image processing method, comprising:

detecting, by a same region detector, a same region of a processing target for each of a plurality of viewpoints from polarization images in a plurality of polarization directions for each of the plurality of viewpoints;

calculating a polarization degree of the same region for each of the plurality of viewpoints based on the polarization images in the plurality of polarization directions; and performing reflection removal process on the same region of the processing target based on the polarization images in the plurality of polarization directions of a viewpoint of the plurality of viewpoints at which the calculated polarization degree is maximized.

10. A non-transitory computer-readable medium having stored thereon, computer-executable instructions which, when executed by a computer, cause the computer to execute operations, the operations comprising:

detecting a same region of a processing target for each of a plurality of viewpoints from polarization images in a plurality of polarization directions for each of the plurality of viewpoints;

calculating a polarization degree of the same region for each of the plurality of viewpoints based on the polarization images in the plurality of polarization directions; and performing reflection removal processing on the same region of the processing target based on the polarization images in the plurality of polarization directions of a viewpoint of the plurality of viewpoints at which the calculated polarization degree is maximized.

* * * * *